(12) United States Patent
Li et al.

(10) Patent No.: US 12,533,527 B2
(45) Date of Patent: Jan. 27, 2026

(54) HEAD POSITIONING FRAME

(71) Applicant: OUR UNITED CORPORATION, Xi'an (CN)

(72) Inventors: Daliang Li, Xi'an (CN); Fangzheng Chen, Xi'an (CN); Ziheng Nie, Xi'an (CN)

(73) Assignee: OUR UNITED CORPORATION, Xi'an (CN)

( * ) Notice: Subject to any disclaimer, the term of this patent is extended or adjusted under 35 U.S.C. 154(b) by 785 days.

(21) Appl. No.: 17/504,152

(22) Filed: Oct. 18, 2021

(65) Prior Publication Data
US 2022/0032085 A1 Feb. 3, 2022

Related U.S. Application Data

(63) Continuation-in-part of application No. PCT/CN2019/083306, filed on Apr. 18, 2019, and a
(Continued)

(30) Foreign Application Priority Data

Jul. 25, 2019 (CN) .......................... 201910675727.2
Jul. 25, 2019 (CN) ......................... 201921187420.X

(51) Int. Cl.
*A61G 13/12* (2006.01)
*A61B 5/00* (2006.01)
(Continued)

(52) U.S. Cl.
CPC .................. *A61N 5/10* (2013.01); *A61B 5/70* (2013.01); *A61B 6/0407* (2013.01); *A61G 2210/50* (2013.01); *A61N 2005/1097* (2013.01)

(58) Field of Classification Search
CPC .............................. A61G 13/121; A61B 90/14
See application file for complete search history.

(56) References Cited

U.S. PATENT DOCUMENTS 4,360,028 A * 11/1982 Barbier .................. A61B 6/501
378/162
4,612,930 A 9/1986 Bremer
(Continued)

FOREIGN PATENT DOCUMENTS

| CN | 2759508 Y | 2/2006 |
| CN | 201414841 Y | 3/2010 |
(Continued)

OTHER PUBLICATIONS

China National Intellectual Property Administration, First office action of Chinese application No. 201910675727.2 issued on Jul. 3, 2024, which is foreign counterpart application of this US application.
(Continued)

*Primary Examiner* — Camtu T Nguyen
(74) *Attorney, Agent, or Firm* — Knobbe, Martens, Olson & Bear, LLP

(57) ABSTRACT

Provided is a head positioning frame that includes an upright rod, a base ring, and a head nail. The upright rod includes at least two connecting portions, and at least one of the at least two connecting portions is made of an insulating material, such that the upright rod, the base ring, the head nail, and a head to be positioned are incapable of forming an electrical circuit loop.

15 Claims, 19 Drawing Sheets

Related U.S. Application Data continuation-in-part of application No. PCT/CN2020/099200, filed on Jun. 30, 2020.

(51) Int. Cl.
*A61B 6/04* (2006.01)
*A61B 90/14* (2016.01)
*A61N 5/10* (2006.01)

(56) References Cited

U.S. PATENT DOCUMENTS

| | | | | |
|---|---|---|---|---|
| 5,156,588 | A | * | 10/1992 | Marcune ........... A61F 5/055 602/17 |
| 5,276,927 | A | | 1/1994 | Day |
| 5,663,646 | A | | 9/1997 | Kuth et al. |
| 8,221,435 | B2 | * | 7/2012 | Arndt ............ A61B 90/14 602/17 |
| 8,548,569 | B2 | * | 10/2013 | Piferi ............ A61B 90/11 600/407 |
| 2003/0040753 | A1 | * | 2/2003 | Daum ........... A61B 17/3462 606/96 |
| 2005/0131425 | A1 | | 6/2005 | Arndt et al. |
| 2008/0195011 | A1 | * | 8/2008 | Arn ............. A61B 90/14 602/17 |
| 2012/0138066 | A1 | * | 6/2012 | Akram ............ A61B 90/14 128/845 |

FOREIGN PATENT DOCUMENTS

| | | |
|---|---|---|
| CN | 103127618 A | 6/2013 |
| CN | 203122502 U | 8/2013 |
| CN | 203662918 U | 6/2014 |
| CN | 104146774 A | 11/2014 |
| CN | 204233147 U | 4/2015 |
| CN | 106621074 A | 5/2017 |
| CN | 207306995 U | 5/2018 |
| CN | 108814640 A | 11/2018 |
| CN | 211383482 U | 9/2020 |
| JP | H05111472 A | 5/1993 |
| WO | 2019075607 A1 | 4/2019 |

OTHER PUBLICATIONS

International search report of PCT application No. PCT/CN2020/099200 issued on Sep. 28, 2020.
International search report of PCT application No. PCT/CN2019/083306 issued on Jan. 17, 2020.

* cited by examiner

HEAD POSITIONING FRAME

CROSS-REFERENCE TO RELATED APPLICATION

This application is a continuation-in-part of International Application No. PCT/CN2019/083306, filed on Apr. 18, 2018, and a continuation-in-part of International Application No. PCT/CN2020/099200, filed on Jun. 30, 2020, which claims priority to Chinese Patent Application No. 201910675727.2, filed on Jul. 25, 2019 and entitled "HEAD POSITIONING FRAME," and Chinese Patent Application No. 201921187420.X, filed on Jul. 25, 2019 and entitled "HEAD POSITIONING FRAME," the disclosure of each of which is herein incorporated by reference in its entirety.

TECHNICAL FIELD

The present disclosure relates to the field of medical equipment, in particular to a head positioning frame.

BACKGROUND

During the radiation therapy for the head, a head positioning frame is required to localize the lesion in the patient's head.

SUMMARY

Embodiments of the present disclosure provide a head positioning frame. The following technical solutions are provided.

A head positioning frame includes an upright rod, a base ring, and a head nail, wherein the upright rod comprises at least two connecting portions among which at least one is made of an insulating material, such that the upright rod, the base ring, the head nail, and a head to be positioned are incapable of forming an electrical circuit loop.

A head positioning frame includes: a sleeve, made of a metallic material; an upright rod, including a head nail connecting portion that is made of an insulating material; and a head nail, connected to the head nail connecting portion via the sleeve.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

Unless otherwise defined, all technical terms adopted in embodiments of the present disclosure have a same meaning as generally understood by those skilled in the art. The embodiments of the present disclosure will be described hereinafter with reference to the accompanying drawings.

It should be noted that expressions such as "exemplary" or "for example" are adopted in embodiments of the present disclosure to indicate an example, illustration, or explanation. Any embodiment or design solution described by "exemplary" or "for example" in embodiments of the present disclosure should not be construed as superior or more advantageous than other embodiments or design solutions.

Rather, the expressions such as "exemplary" or "for example" are intended to illustrate the relevant concepts in a specific fashion.

It should also be noted that expressions, such as "of", "corresponding", and "relevant", are sometimes used interchangeably in embodiments of the present disclosure, and it should be noted that these expressions express the same meaning in a case that the distinction therebetween is not emphasized.

In order to clearly describe the technical solution of the embodiments of the present disclosure, expressions such as "first". "second" and the like are adopted to distinguish identical or similar items with essentially the same function and role in the embodiments of the present disclosure, and those skilled in the art may understand that "first", "second" and the like do not limit the number and order of execution.

The existing radiotherapy technology, which is getting more and more mature, has an increasing high treatment precision requirement in the radiation therapy process. In order to ensure that radioactive rays emitted by the radiotherapy equipment can accurately irradiate tumor tissues to be treated, the area to be treated of each patient must be fixed and positioned before conducting the precise radiotherapy, such that the radioactive rays can accurately irradiate the target. Typically, the respective components (e.g., head nails, upright rods, base rings, etc.) of the head positioning frame are made of conductive metallic materials. In this way, during the scanning for imaging or radiation therapy, a closed circuit loop will be formed in the head positioning frame, which will generate a great induced electromotive force that will eventually dissipate in the form of heat energy, causing the heating of the head nail and in some severe cases, even resulting in burns to the patient's head.

Figure 1:
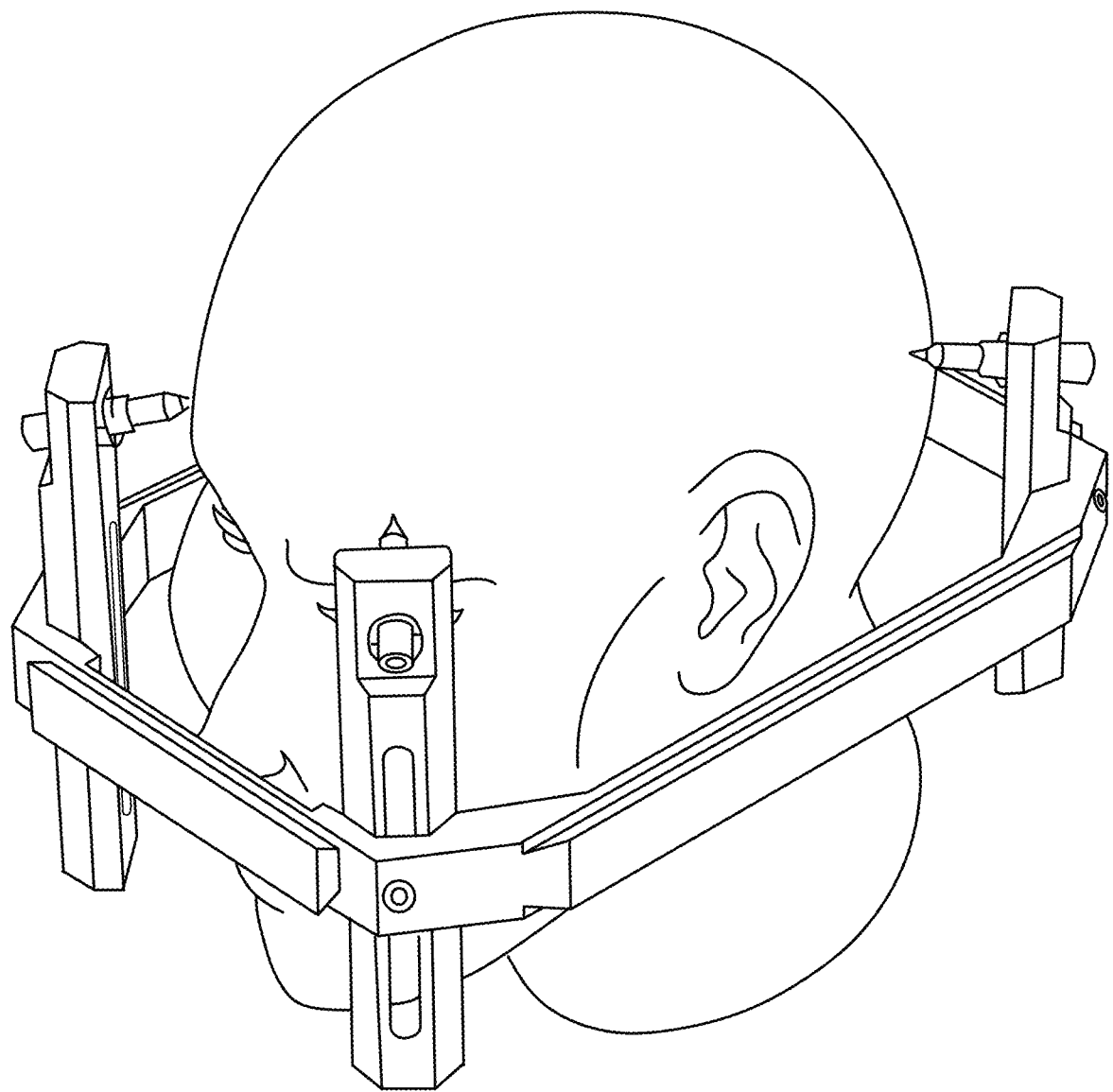
FIG. 1 is a schematic diagram of a head positioning frame and an operating state thereof according to the related art.

As shown in FIG. 1, the head positioning frame is a device used for directly contacting the patient's skin, and realizing fixation and positioning of the heads during the radiation therapy against a head tumor. In order to meet the requirements on treatment precision, the existing head positioning frame is generally entirely made of titanium alloy to ensure that the head position frame can adapt to various environments during use and have a good rigidity. However, when performing a CT scanning, the head positioning frame will be exposed to an alternating magnetic field, which will result in an electrical circuit loop formed between the patient and the head positioning frame, generating instantaneous current inside the circuit loop and then releasing heat. This may lead to a high temperature that burns the patient's skin, bringing great harm to the patient.

To solve this problem, an implementable solution in the related art is to provide an insulating sleeve at a junction connecting the head nail and the upright rod, so as to prevent the formation of an electrical circuit loop between the head positioning frame and the patient, thereby avoiding the generation of electric current and the heating of the head positioning frame. However, repeated connection and disconnection of the head nail, sleeve, and upright rod may lengthen the treatment duration of the physician and reduce the efficiency of the treatment.

Figure 2:
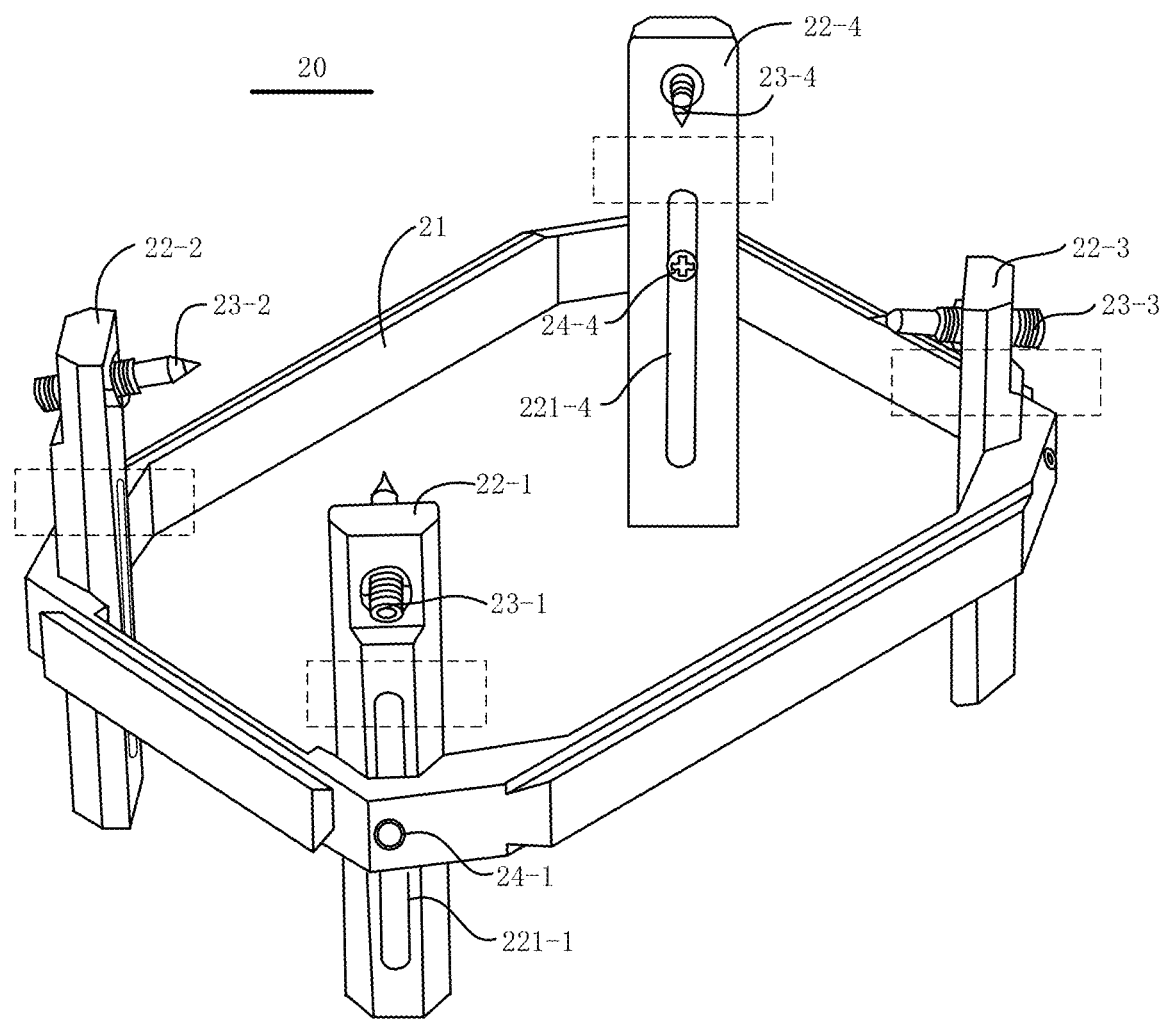
FIG. 2 is a schematic structural diagram of a head positioning frame according to an embodiment of the present disclosure.

In response to the aforesaid problem, embodiments of the present disclosure provide a head positioning frame. As shown in FIG. 2, a head positioning frame 20 includes: a base ring 21, a plurality of upright rods 22, and head nails 23 corresponding to the upright rods 22 in one-to-one correspondence.

The upright rods 22 are fixedly connected to the base ring 21, and each head nail 23 is fixedly connected to an end of an upright rod 22. The head positioning frame in practice generally includes four upright rods and four head nails. In this case, as shown in FIG. 2, the plurality of upright rods 22 specifically includes an upright rod 22-1, an upright rod 22-2, an upright rod 22-3, and an upright rod 22-4, and the head nails 23 specifically include a head nail 23-1, a head nail 23-2, a head nail 23-3, and a head nail 23-4.

The upright rod 20 includes at least two connecting portions, among which at least one (for example, the connecting portion circled by dotted lines in FIG. 2) is made of an insulating material, such that the upright rod 22, the base ring 21, the head nail 23, and a head to be positioned are incapable of forming an electrical circuit loop therebetween. Specifically, as shown in FIG. 2, as an electrical circuit loop may otherwise be formed from any two upright rods, corresponding head nails thereof, base ring and the patient, every upright rod needs to have at least one connecting portion made of the insulating material.

Figure 3:
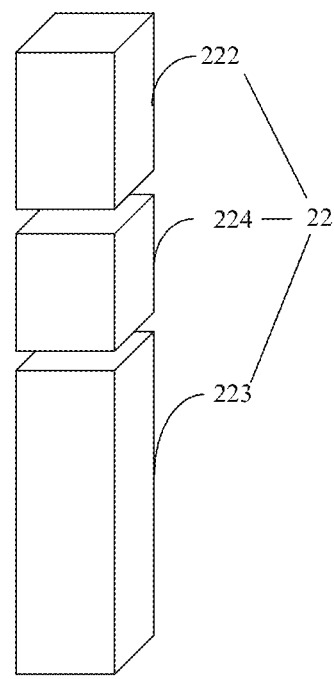
FIG. 3 is a schematic structural diagram of an upright rod according to an embodiment of the present disclosure.

Specifically, the connecting portion made of the insulating material of the upright rod can necessarily prevent the ends of the upright rod which are respectively connected to the base ring and the head nail from forming an electrical connection. Therefore, as shown in FIG. 3, in the case that the shape of the upright rod 22 is a long rod with a certain thickness, the connecting portion 224 made of the insulating material (the ends of the upright rod which are connected to the base ring and the head nail are 222 and 223, respectively) may be, for example, a connecting portion formed by transversely cutting the upright rod, as long as the connecting portion can block the electrical connection between any two upright rods and the base ring. The way in which the two connecting portions that are connected with each other are segmented is not specifically limited here.

Exemplarily, as shown in FIG. 2, in order to appropriately adjust the relative position between the upright rod 22 and the base ring 21 according to the treatment needs during use, the head positioning frame 20 may further include a fixing bolt 24 (the figure merely shows 24-1 corresponding to 23-1 and 24-4 corresponding to 23-4, and does not show the fixing bolts corresponding to 23-2 and 23-3). The upright rod 22 is provided with a waist-shaped through hole 221, and the base ring 21 is provided with a seventh through hole. The fixing bolt 24 is configured to cooperate with the waist-shaped through hole 221 (including 222-1, 222-2, 222-3, and 222-4, wherein 221-3 and 221-2 are not shown) and the seventh through hole (not shown in the figure, yet in practice, there being four seventh through holes respectively corresponding to 221-1, 221-2, 221-3, and 221-4), such that the upright rod 22 is fixedly connected to the base ring 21. Through the provision of the waist-shaped through hole 221, the position at which the upright rod 22 is fixedly connected to the base ring 21 can be adjusted according to the actual situation.

Exemplarily, the head nail may be fixedly connected to the upright rod directly or via a sleeve.

Exemplarily, the insulating material comprises at least one of ceramic or graphite reinforced fiber plastic.

In some embodiments, as the head positioning frame is generally used in intense magnetic field, the various components of the head positioning frame, i.e., the base ring, the head nail, and the upright rod except for the connecting portion made of the insulating material, may be made of a non-magnetic material such as titanium alloy, so as to ensure that each connecting portion of the head positioning frame would not be affected by the intense magnetic field, and that the head positioning frame has a good rigidity to guarantee the positioning precision. The insulating material here should also be a non-magnetic material. In addition, such non-magnetic material may be a titanium alloy, so as to meet the rigidity requirements in the positioning process and avoid causing undesirable reaction such as skin allergy of the patient.

In some embodiments, to meet the rigidity requirements of the upright rod, at least one of the at least two connecting portions included in the upright rod is made of a rigid non-magnetic material. In this case, when being subjected to an external force, the rigid material may generate a deformation within a predetermined range, such as a titanium alloy.

Figure 4:
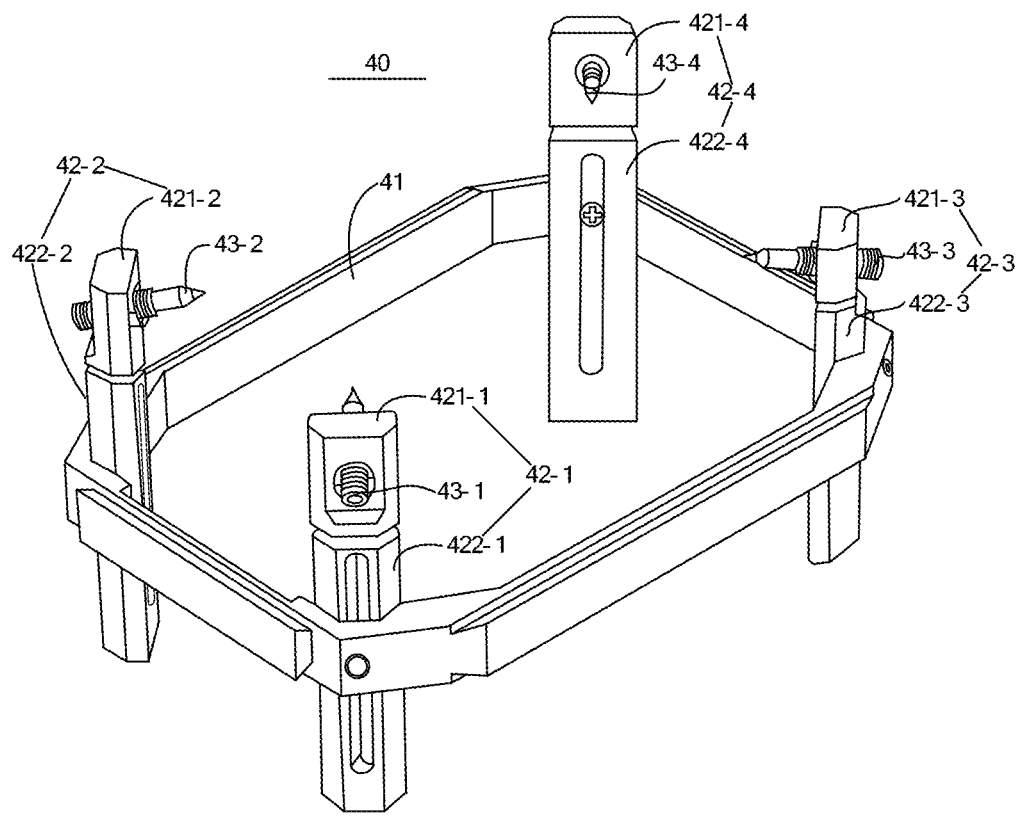
FIG. 4 is a schematic structural diagram of a head positioning frame according to another embodiment of the present disclosure.

In some embodiments, the at least two connecting portions include a first connecting portion connected to the head nail and a second connecting portion connected to the base ring. As shown in FIG. 4, specifically, in order to ensure that no current is generated in the head positioning frame 40, while making the rigidity of the upright rod 42 (42-1, 42-2, 42-3, and 42-4) meet the requirements so as to guarantee that the upright rod 42 generates as little deformation as possible during the use of the head positioning frame 40, the upright rod 42 in the head positioning frame 40 includes a first connecting portion 421 (421-1, 421-2, 421-3, and 421-4) connected to the head nail 43 (43-1, 43-2, 43-3, and 43-4) and a second connecting portion 422 (422-1, 422-2, 422-3, and 422-4) connected to the base ring 41. Here, the second connecting portion 422 is fixedly connected to the base ring 41, and an end of the second connecting portion 422 is fixedly connected to an end of the first connecting portion 421, with the other end of the first connecting portion 421 being fixedly connected to the head nail 43 (43-1, 43-2, 43-3, and 43-4). As shown in FIG. 4, when either one of the two connecting portions of the upright rod 42 is made of the insulating material, for the purpose of preventing the electrical connection between the base ring 41, the upright rod 42, and the head nail 43, the two connecting portions must be respectively connected to the base ring 41 and the head nail 43. It should be noted that the labeling of 421 and 422 in FIG. 4 is only given as an example, and 421 and 422 may be interchanged. That is, 421 may be changed to 422, and 422 may be changed to 421.

Here, in the case that the first connecting portion 421 is made of the insulating material, the second connecting portion 422 is made of a rigid material (e.g., a metal or alloy); and in the case that the first connecting portion 421 is made of the rigid material (e.g., a metal or alloy), the second connecting portion 422 is made of the insulating material. Specifically, in order to ensure that the head positioning frame can be used in a therapeutic environment with intense magnetic fields, the aforesaid rigid material should be a non-ferromagnetic material, such as a titanium alloy.

Specifically, among the at least two connecting portions of the upright rod, any two connecting portions that are connected with each other are respectively provided with a connecting structure to achieve a fixed connection between the two connecting portions that are connected with each other.

Figure 5A:
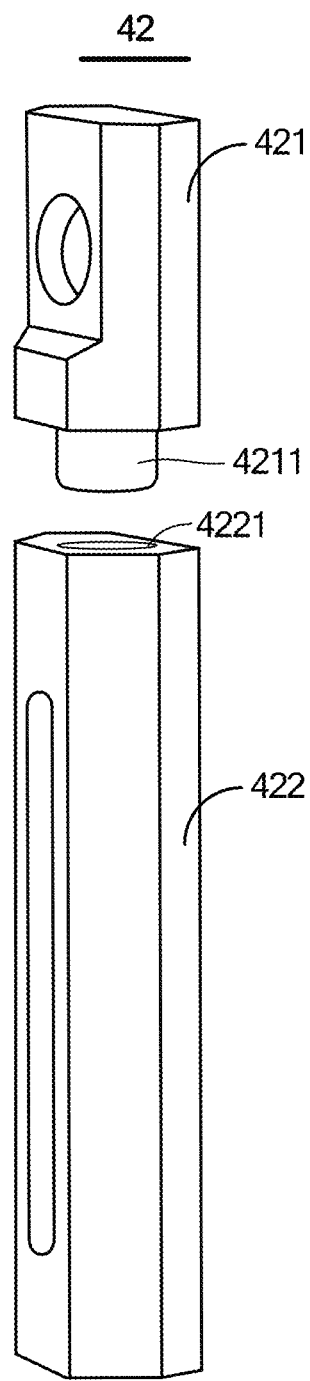
FIG. 5*a* is a schematic structural diagram of an upright rod according to another embodiment of the present disclosure.
Figure 5B:
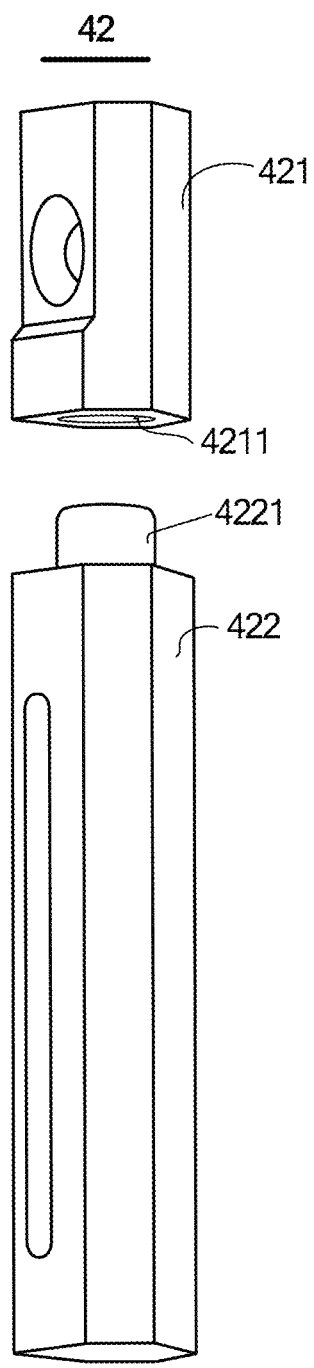
FIG. 5*b* is another schematic structural diagram of an upright rod according to another embodiment of the present disclosure.

In one implementable manner, the two connecting portions that are connected with each other in the upright rod may form an interference fit. Exemplarily, as shown in FIG. 5 (FIG. 5a and FIG. 5b) which takes an upright rod 42 that includes two connecting portions as an example, at the ends where the first connecting portion 421 and the second connecting portion 422 are connected, a first projecting portion 4211/4221 and a first groove 4221/4211 are respectively provided. Specifically, as shown in FIG. 5a, the first projecting portion 4211 is provided on an end of the first connecting portion 421, and the first groove 4221 is provided on an end of the second connecting portion 422. Alternatively, as shown in FIG. 5b, the first projecting portion 4221 is provided on an end of the second connecting portion 422, and the first groove 4211 is provided on an end of the first connecting portion 421. The first projecting portion 4211/4221 and the first groove 4221/4211 form an interference fit to realize the fixed connection between the first connecting portion 421 and the second connecting portion 422.

In another implementable manner, the two connecting portions that are connected with each other in the upright rods may be fixed via a pin. Exemplarily, as shown in FIG. 6 (FIG. 6a and FIG. 6b) which takes an upright rod 42 that includes two connecting portions as an example, the upright rod 42 further includes a first locking pin 423.

In some embodiments, a second projecting portion 4212/4222 and a second groove 4222/4212 are respectively provided at the ends where the first connecting portion 421 and the second connecting portion 422 are connected; and the second projecting portion 4212/4222 can fit and be mounted into the second groove 4222/4212. Here, the fit may be a clearance fit, an interference fit, or a transition fit, which is not specifically limited here.

Figure 6A:
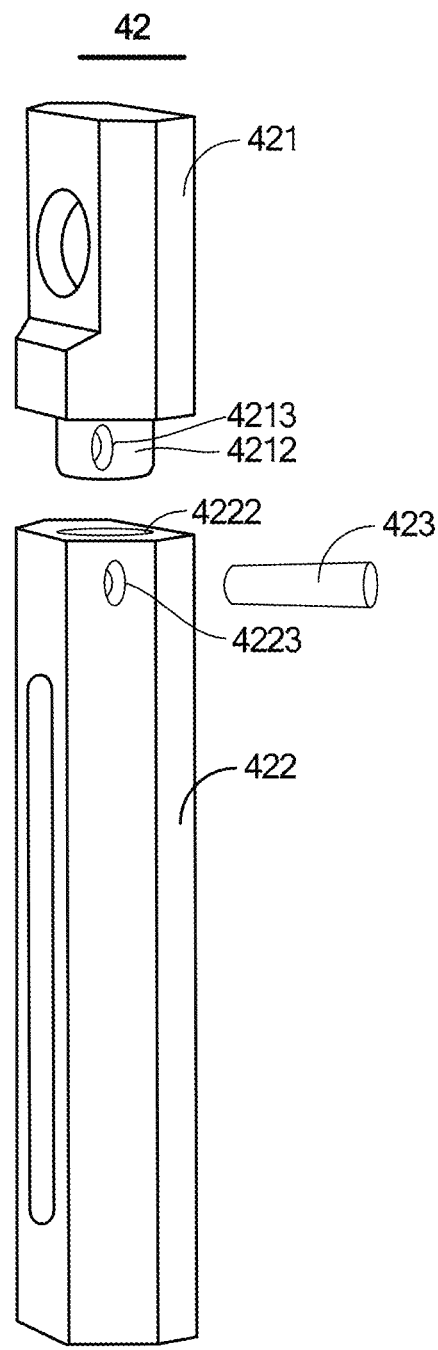
FIG. 6*a* is a schematic structural diagram of another upright rod according to another embodiment of the present disclosure.
Figure 6B:
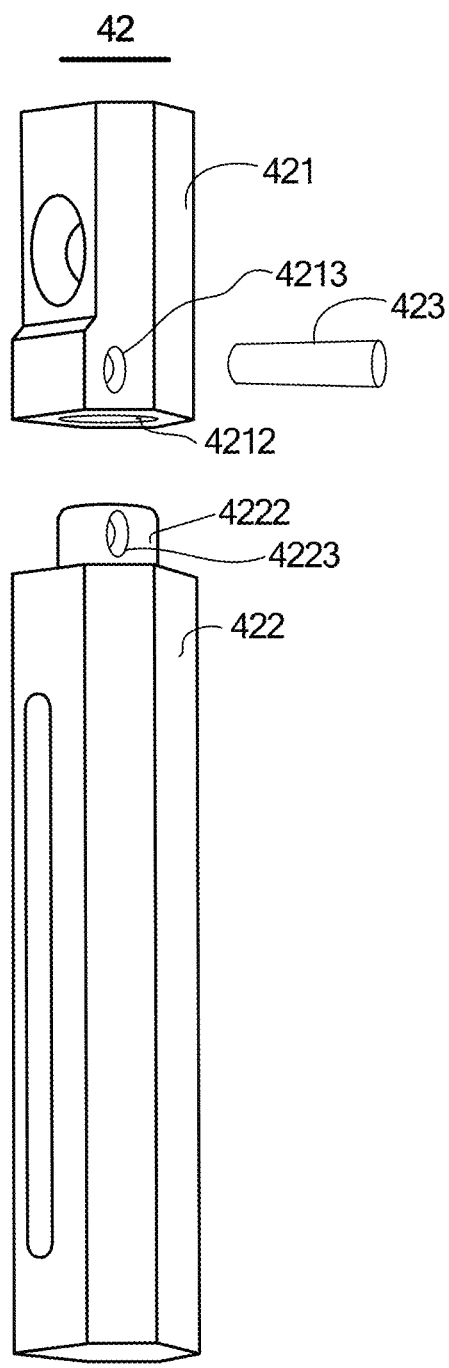
FIG. 6*b* is another schematic structural diagram of another upright rod according to another embodiment of the present disclosure.

Specifically, as shown in FIG. 6a, the second projecting portion 4212 is provided on an end of the first connecting portion 421, and the second groove 4222 is provided on an end of the second connecting portion 422; the second projecting portion 4212 is provided with a first through hole 4213 with an extending direction perpendicular to a center axis of the upright rod, and the second connecting portion 422 is provided with a second through hole 4223 passing through the second groove 4222 and extending in a direction perpendicular to the center axis of the upright rod. Alternatively, as shown in FIG. 6b, the second projecting portion 4222 is provided on an end of the second connecting portion 422, and the second groove 4212 is provided on an end of the first connecting portion 421; and the second projecting portion 4222 is provided with the first through hole 4223 with an extending direction perpendicular to the center axis of the upright rod 42, and the first connecting portion 421 is provided with the second through hole 4213 passing through the second groove 4212 and extending in a direction perpendicular to the center axis of the upright rod 42.

The first locking pin 423 is configured to fit into the first through hole 4213/4223 and the second through hole 4223/4213 when the second projecting portion 4212/4222 is mounted into the second groove 4222/4212, such that the first connecting portion 421 and the second connecting portion 422 are fixedly connected to each other.

Figure 7:
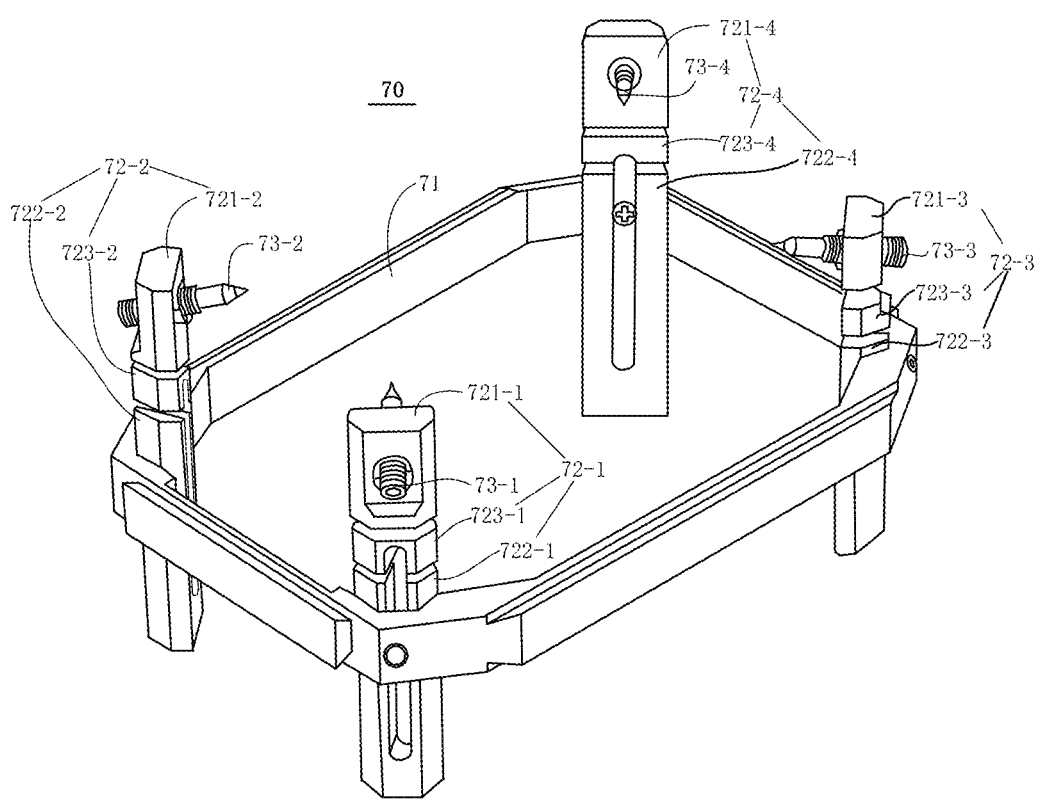
FIG. 7 is a schematic structural diagram of a head positioning frame according to still another embodiment of the present disclosure.

In another implementable manner, the at least two connecting portions may further include a third connecting portion between the first connecting portion and the second connecting portion. As shown in FIG. 7, the upright rod 72 includes a first connecting portion 721 (721-1, 721-2, 721-3, and 721-4), a second connecting portion 722 (722-1, 722-2, 722-3, and 722-4), and a third connecting portion 723 (723-1, 723-2, 723-3, and 7234). The second connecting portion 722 is fixedly connected to the base ring 71, and an end of the second connecting portion 722 is fixedly connected to an end of the third connecting portion 723; and the other end of the third connecting portion 723 is connected to an end of the first connecting portion 721, and the other end of the first connecting portion 721 is fixedly connected to the head nail 73 (73-1, 73-2, 73-3, and 734).

In order to ensure that the upright rod 72 has at least one connecting portion to block the electrical connection between the upright rod 72, the base ring 71, and the head nail 73, while still ensuring that the upright rod can meet the rigidity requirements to some extent, the upright rod 72 includes the first connecting portion 721, the second connecting portion 722, and the third connecting portion 723, the following three cases may occur:

in the case that the first connecting portion 721 is made of the rigid material, the second connecting portion 722 and/or the third connecting portion 723 is made of the insulating material;

in the case that the second connecting portion 722 is made of the rigid material, the first connecting portion 721 and/or the third connecting portion 723 is made of the insulating material; and in the case that the third connecting portion 723 is made of the rigid material, the first connecting portion 721 and/or the second connecting portion 722 is made of the insulating material.

Exemplarily, when the upright rods are made merely by the rigid material and the insulating material, the aforesaid three cases may particularly include the following six cases:

in the case that the first connecting portion 721 and the second connecting portion 722 are both made of the insulating material, the third connecting portion 723 is made of the rigid material;

in the case that the first connecting portion 721 and the third connecting portion 723 are both made of the insulating material, the second connecting portion 722 is made of the rigid material;

in the case that the second connecting portion 722 and the third connecting portion 723 are both made of the insulating material, the first connecting portion 721 is made of the rigid material;

in the case that the first connecting portion 721 and the second connecting portion 722 are both made of the rigid material, the third connecting portion 723 is made of the insulating material;

in the case that the first connecting portion 721 and the third connecting portion 723 are both made of the rigid material, the second connecting portion 722 is made of the insulating material; and in the case that the second connecting portion 722 and the third connecting portion 723 are both made of the rigid material, the first connecting portion 721 is made of the insulating material.

Specifically, among the at least two connecting portions of the upright rod, any two connecting portions that are connected with each other are respectively provided with a connecting structure to achieve a fixed connection between the two connecting portions that are connected with each other.

In one implementable manner, the two connecting portions that are connected with each other in the upright rod are fixed to each other via an interference fit. Exemplarily, as shown in FIG. 8 (FIGS. 8a, 8b, 8c, and 8d) which takes the upright rods 72 each including three connecting portions as an example, a third projecting portion 7221/7231 and a third groove 7231/7221 are provided respectively at the ends where the second connecting portion 722 and the third connecting portion 723 are connected; and a fourth projecting portion 7232/7211 and a fourth groove 7211/7232 are provided respectively at the ends where the third connecting portion 723 and the first connecting portion 721 are connected.

Figure 8A:
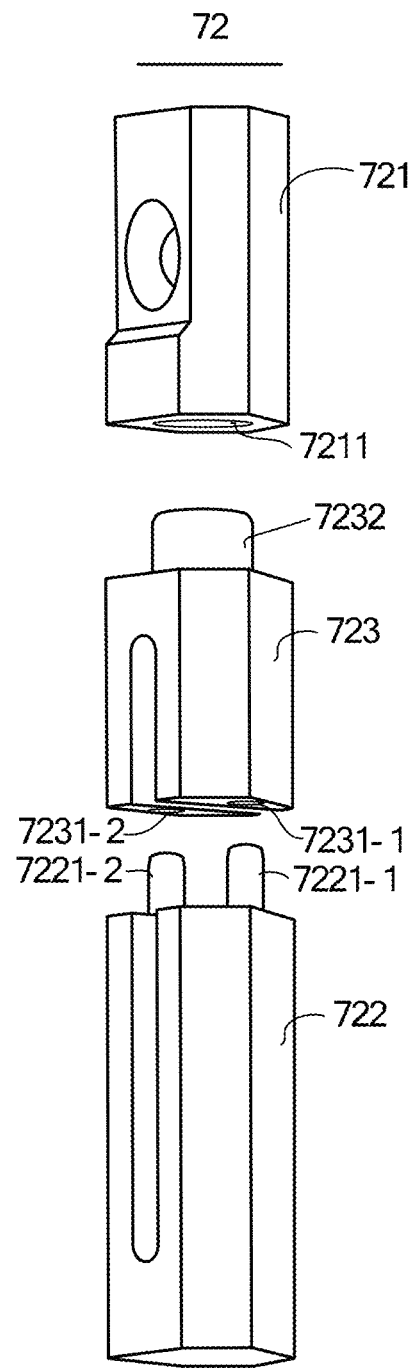
FIG. 8*a* is a schematic structural diagram of an upright rod according to still another embodiment of the present disclosure.

Specifically, as shown in FIG. 8a, the third projecting portion 7221 (7221-1 and 7221-2) is provided on an end of the second connecting portion 722; the third groove 7231 (7231-1 and 7231-2) is provided on an end of the third connecting portion 723; the fourth projecting portion 7232 is provided on the other end of the third connecting portion 723; and the fourth groove 7211 is provided on an end of the first connecting portion 721.

Figure 8B:
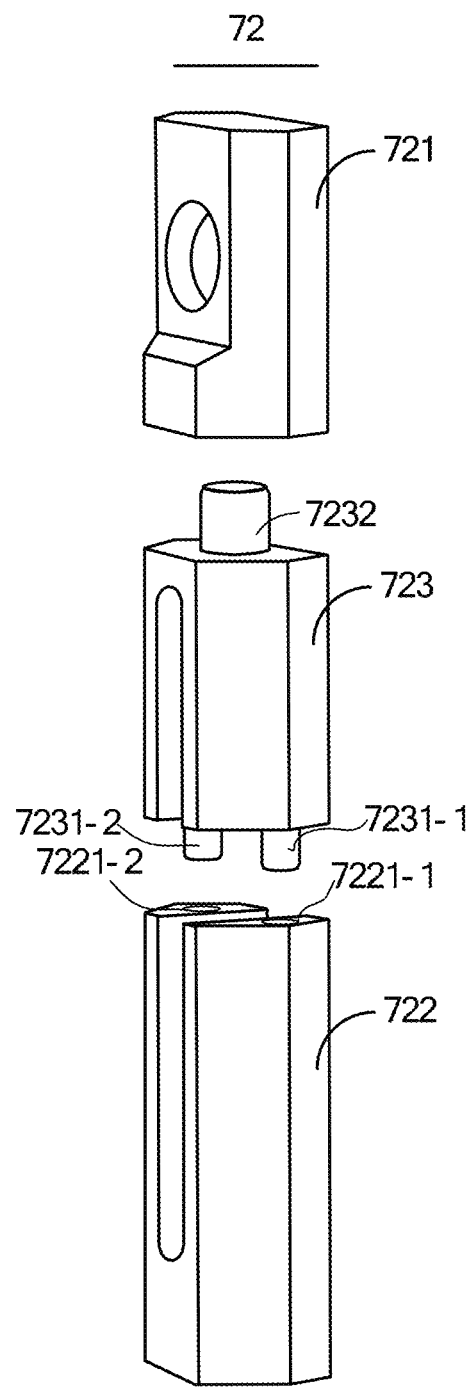
FIG. 8*b* is another schematic structural diagram of an upright rod according to still another embodiment of the present disclosure.

Alternatively, as shown in FIG. 8b, the third groove 7221 (7221-1 and 7221-2) is provided on an end of the second connecting portion 722; the third projecting portion 7231 (7231-1 and 7231-2) is provided on an end of the third connecting portion 723; the fourth projecting portion 7232 is provided on the other end of the third connecting portion 723; and the fourth groove 7211 (not shown) is provided on an end of the first connecting portion 721.

Figure 8C:
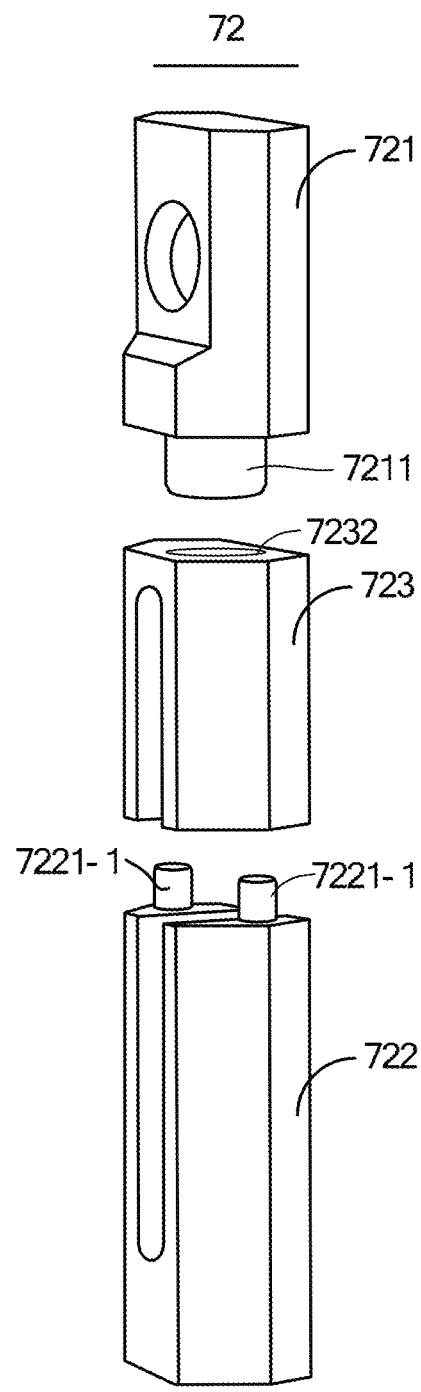
FIG. 8*c* is still another schematic structural diagram of an upright rod according to still another embodiment of the present disclosure.

Alternatively, with reference to FIG. 8c, the third projecting portion 7221 (7221-1 and 7221-2) is provided on an end of the second connecting portion 722; the third groove 7231 (7231-1 and 7231-2, not shown) is provided on an end of the third connecting portion 723; the fourth groove 7232 is provided on the other end of the third connecting portion 723; and the fourth projecting portion 7211 is provided on an end of the first connecting portion 721.

Figure 8D:
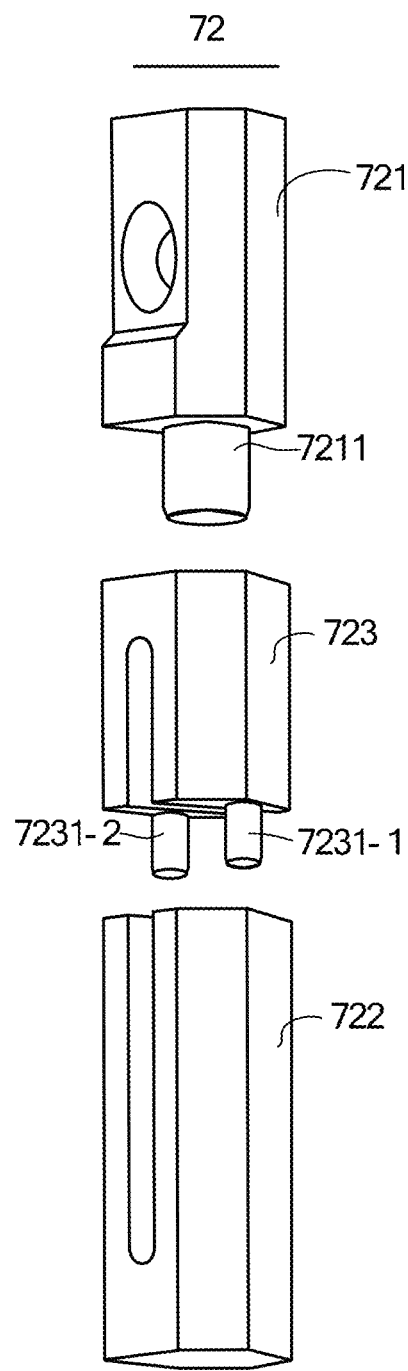
FIG. 8*d* is yet still another schematic structural diagram of an upright rod according to still another embodiment of the present disclosure.

Alternatively, with reference to FIG. 8d, the third groove 7221 (7221-1 and 7221-2) is provided on an end of the second connecting portion 722; the third projecting portion 7231 (7231-1 and 7231-2) is provided on an end of the third connecting portion 723; the fourth groove 7232 (not shown) is provided on the other end of the third connecting portion 723; and the fourth projecting portion 7211 is provided on an end of the first connecting portion 721.

The third projecting portion 7221/7231 and the third groove 7231/7221 are fixed to each other by an interference fit to achieve the fixed connection between the second connecting portion 722 and the third connecting portion 723; and the fourth projecting portion 7232/7211 and the fourth groove 7211/7232 are fixed to each other by an interference fit to achieve the fixed connection between the third connecting portion 723 and the first connecting portion 721.

In another implementable manner, the two connecting portions that are connected with each other in the upright rod may be fixed via pins. Exemplarily, as shown in FIG. 9 (FIGS. 9a, 9b, 9c, and 9d) that takes the upright rods 72 each including three connecting portions as an example, the upright rod 72 further includes a second locking pin 724 and a third locking pin 725.

The third projecting portion 7221/7231 and the third groove 7231/7221 are provided respectively at the ends where the second connecting portion 722 and the third connecting portion 723 are connected; and the fourth projecting portion 7232/7211 and the fourth groove 7211/7232 are provided respectively at the ends where the third connecting portion 723 and the first connecting portion 721 are connected. The third projecting portion and the third groove, or the fourth projecting portion and the fourth groove, may be fixed to each other by a clearance fit, an interference fit, or a transition fit, which is not specifically limited here.

As shown in FIGS. 9a, 9b, 9c, and 9d, the particulars of configurations of the grooves and projecting portions among the second connecting portion, the third connecting portion, and the first connecting portion are similar as those shown in FIGS. 8a, 8b, 8c, and 8d, respectively, with the following differences.

Figure 9A:
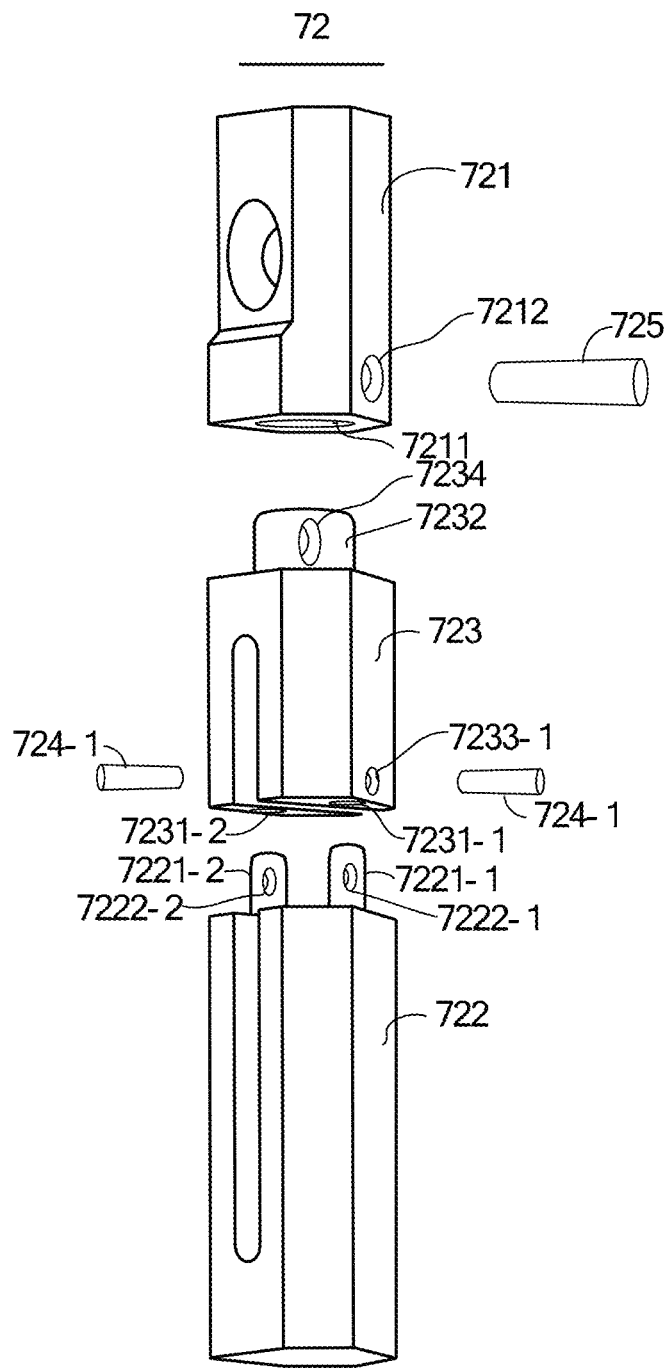
FIG. 9*a* is a schematic structural diagram of another upright rod according to still another embodiment of the present disclosure.

As shown in FIG. 9a, the third projecting portion 7221 (7221-1 and 7221-2) is provided with a third through hole 7222 (7222-1 and 7222-2) with an extending direction perpendicular to the center axis of the upright rod 72, and the third connecting portion 723 is provided with a fourth through hole 7233 (7233-1 and 7233-2, with 7233-2 being not shown) passing through the third groove 7231 and extending in a direction perpendicular to the center axis of the upright rod 72. The fourth projecting portion 7232 is provided with a fifth through hole 7234 with an extending direction perpendicular to the center axis of the upright rod 72, and the first connecting portion 721 is provided with a sixth through hole 7212 passing through the fourth groove 7211 and extending in a direction perpendicular to the center axis of the upright rod 72.

Figure 9B:
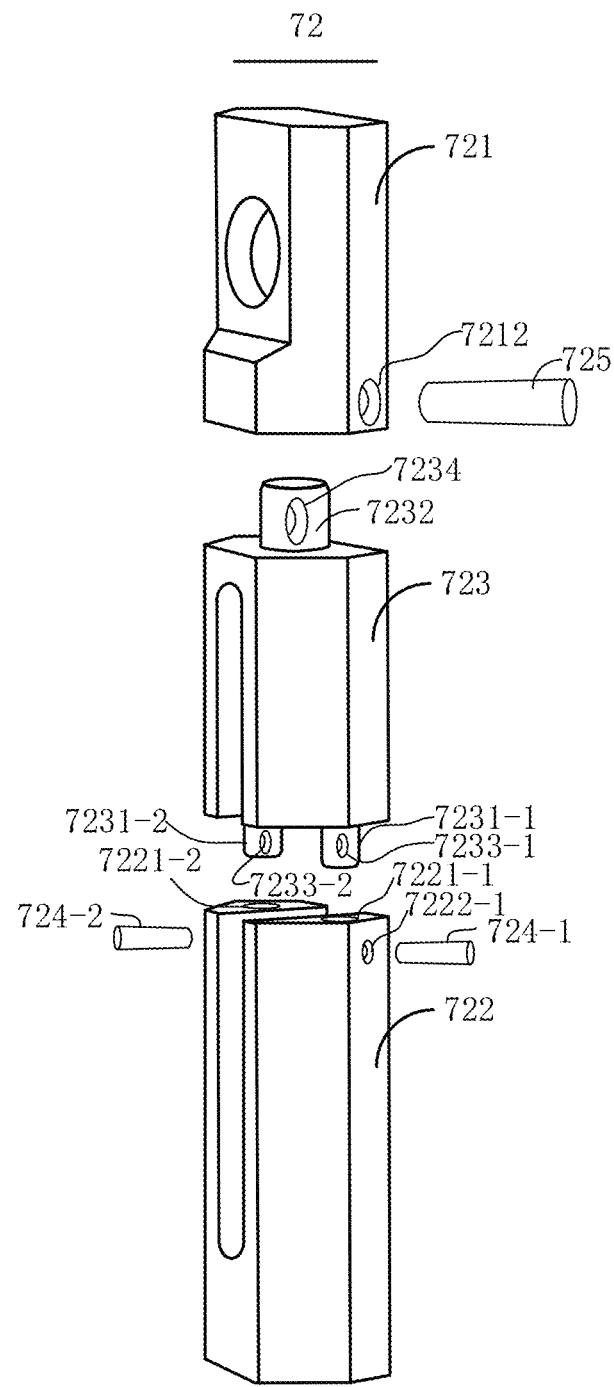
FIG. 9*b* is another schematic structural diagram of another upright rod according to still another embodiment of the present disclosure.

As shown in FIG. 9*b*, the third projecting portion 7231 (7231-1 and 7231-2) is provided with a third through hole 7233 (7233-1 and 7233-2) with an extending direction perpendicular to the center axis of the upright rod 72, and the second connecting portion 722 is provided with a fourth through hole 7222 (7222-1 and 7222-2, with 7222-2 being not shown) passing through the third groove 7221 and extending in a direction perpendicular to the center axis of the upright rod 72. The fourth projecting portion 7232 is provided with a fifth through hole 7234 with an extending direction perpendicular to the center axis of the upright rod 72, and the first connecting portion 721 is provided with a sixth through hole 7212 passing through the fourth groove 7211 (not shown) and extending in a direction perpendicular to the center axis of the upright rod 72.

Figure 9C:
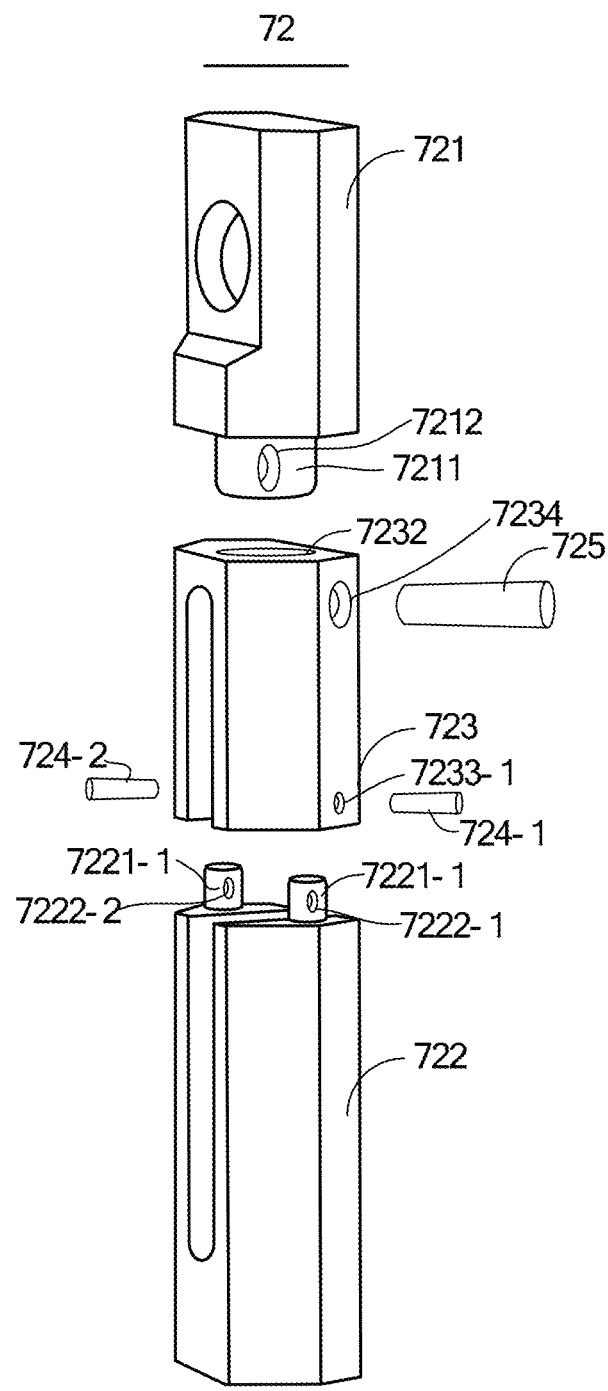
FIG. 9*c* is still another schematic structural diagram of another upright rod according to still another embodiment of the present disclosure.

As shown in FIG. 9*c*, the third projecting portion 7221 (7221-1 and 7221-2) is provided with a third through hole 7222 (7222-1 and 7222-2) with an extending direction perpendicular to the center axis of the upright rod 72, and the third connecting portion 723 is provided with a fourth through hole 7233 (7233-1 and 7233-2, with 7233-2 being not shown) passing through the third groove 7231 (7231-1 and 7231-2, which are not shown) and extending in a direction perpendicular to the center axis of the upright rod 72. The fourth projecting portion 7211 is provided with a fifth through hole 7212 with an extending direction perpendicular to the center axis of the upright rod 72, and the third connecting portion 723 is provided with a sixth through hole 7234 passing through the fourth groove 7232 and extending in a direction perpendicular to the center axis of the upright rod 72.

Figure 9D:
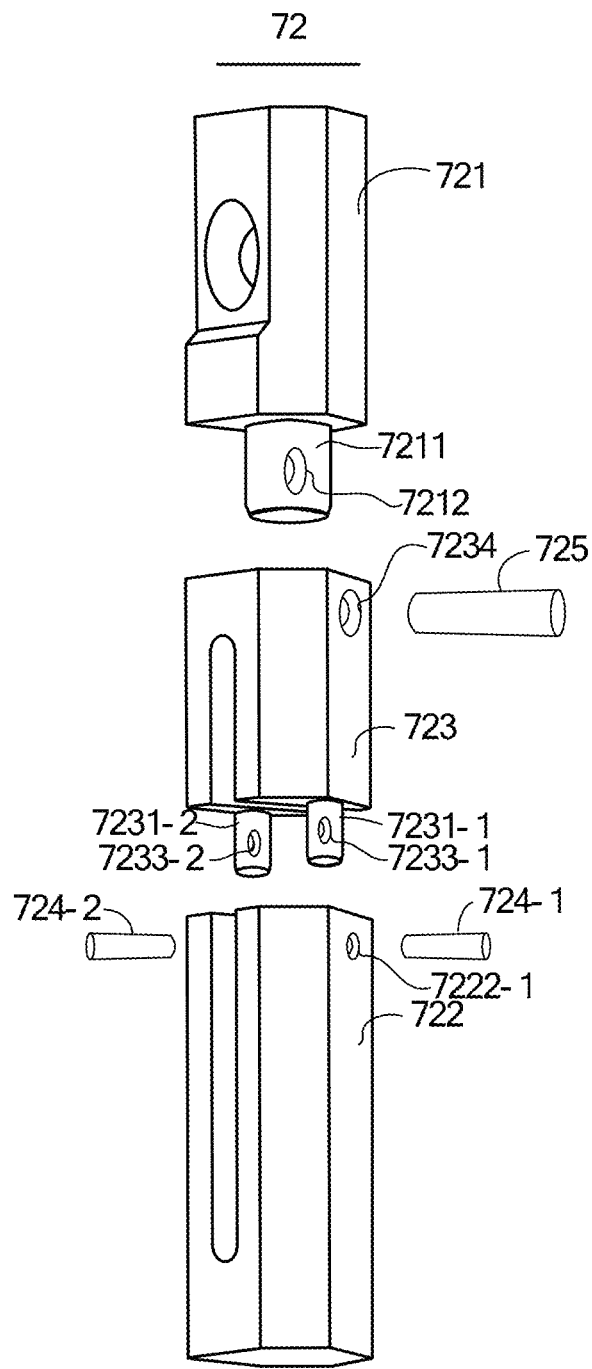
FIG. 9*d* is yet still another schematic structural diagram of another upright rod according to still another embodiment of the present disclosure.

As shown in FIG. 9*d*, the third projecting portion 7231 (7231-1 and 7231-2) is provided with a third through hole 7233 (7233-1 and 7233-2) with an extending direction perpendicular to the center axis of the upright rod 72, and the second connecting portion 722 is provided with a fourth through hole 7222 (7222-1 and 7222-2, with 7222-2 being not shown) passing through the third groove 7221 (7221-1 and 7221-2, which are not shown) and extending in a direction perpendicular to the center axis of the upright rod 72. The fourth projecting portion 7211 is provided with a fifth through hole 7212 with an extending direction perpendicular to the center axis of the upright rod 72, and the third connecting portion 723 is provided with a sixth through hole 7234 passing through the fourth groove 7232 (not shown) and extending in a direction perpendicular to the center axis of the upright rod 72.

The second locking pin 724 (724-1 and 724-2) is configured to fit into the third through hole 7222/7233 and the fourth through hole 7233/7222 when the third projecting portion 7221/7231 is mounted into the third groove 7231/7221, such that the second connecting portion 722 and the third connecting portion 723 are fixedly connected with each other.

The third locking pin 725 is configured to fit into the fifth through hole 7234/7212 and the sixth through hole 7212/7234 when the fourth projecting portion 7232/7211 is mounted into the fourth groove 7211/7232, such that the third connecting portion 723 and the first connecting portion 721 are fixedly connected with each other.

It should be noted that the projecting portions and grooves provided in the accompanying drawings corresponding to embodiments of the present disclosure are cylindrical projecting portions and cylindrical grooves, but in practice, they may be other types of projecting portions and grooves, which are not specifically limited here. The connection relationship between the aforesaid connecting portions is not limited to interference fit and pin fit, and other implementing manners for the fixed connection are also applicable. The present disclosure only provides some examples, and is not intended to make a specific limitation. In addition, to ensure that the head positioning frame is not affected by the intense magnetic fields, the aforesaid pins are all made of the non-ferromagnetic material as well, such as titanium alloy. In a case where the upright rod according to the embodiments of the present disclosure has several segments, the manner for implementing the fixed connection between different segments may be the aforesaid interference fit, or the aforesaid screw connection, or in other fashions. The aforesaid embodiments are illustrated by taking merely a same implementing manner for the fixed connection of the upright rod as an example, and the embodiments of the present disclosure are not intended to specifically limit the implementing manner for the fixed connection between two connecting portions that are connected with each other. In addition, the term "fixed connection" in each of the embodiments only indicates that the different portions are fixed to each other by some connecting methods (e.g., screw connection, interference fit, welding, etc.), and does not limit whether the different portions are capable of being disassembled after the fixed connection. The specific connecting methods adopted to fixedly connect different portions can be selected depending on the actual situations.

In addition, the aforesaid two specific embodiments of the upright rods should be construed as all the implementations of the upright rods. In practice, the upright rod may be divided into more than three segments, as long as there is a connecting portion made of the insulating material and there is no electrical connection between the head nail and the base ring. This is not specifically limited here. In some embodiments, it is desirable that there are as few as possible connecting portions made of the insulating material.

Exemplarily, the insulating material and the rigid material are both non-magnetic materials.

In some embodiments, a part or all of the base ring are made of an insulating material, which may also achieve the effect of avoiding an electrical circuit loop between the head positioning frame and the patient. The base ring here may has a connecting portion made of an insulating material, as long as no electrical connection can be established between any two upright rods. In practice, it is possible to only configure a connecting portion of the upright rod to be made of insulating material, or configure a part or all of the base ring to be made of insulating material. The two configurations may be applied simultaneously or separately depending on the actual needs.

Some embodiments of the present disclosure further provide an upright rod, a head positioning frame, and a medical equipment. The upright rod is applied to a head positioning frame which may further include a base ring, and a head nail in addition to the upright rod. In the embodiments of the present disclosure, the upright rod includes at least two connecting portions, among which at least one is made of an insulating material, such that the upright rod, the base ring, the head nail, and a head to be positioned are incapable of forming an electrical circuit loop. In the upright rod according to the embodiments of the present disclosure, as a connecting portion in the upright rod is made of an insulating material, in the case that the remaining connecting portions of the upright rod, the base ring and head nail of the head positioning frame to which the upright rod belongs are all made of conductive metallic materials for ensuring the rigidity, because no electrical circuit loop can be formed between the upright rod, base ring, head nail, and the head to be positioned, no electric current is generated even if the head positioning frame works in an alternating magnetic field, such that the head positioning frame would not be heated, thereby preventing the head positioning frame from causing burns to the patient during the radiation therapy. Therefore, the upright rod according to the embodiments of the present disclosure can prevent burning injury to the patient during the use of the head positioning frame.

In another aspect, the head positioning frame in the related art may add an insulating sleeve between the head nail and the upright rod to prevent a closed circuit loop from being formed by the head positioning frame. The head nail is connected to the upright rod via the insulating sleeve made of an insulating material which generally has a poor rigidity. The insulating sleeve is prone to wear in the case that it is frequently adjusted, assembled to or disassembled from the head nail, thereby causing a weak connection between the head nail and the upright rod. To this end, the embodiments of the present disclosure further provide another head positioning frame, which can solve the problem of the related art that the insulating sleeve is easy to wear which may result in a poor fixation of the head nail.

Figure 10:
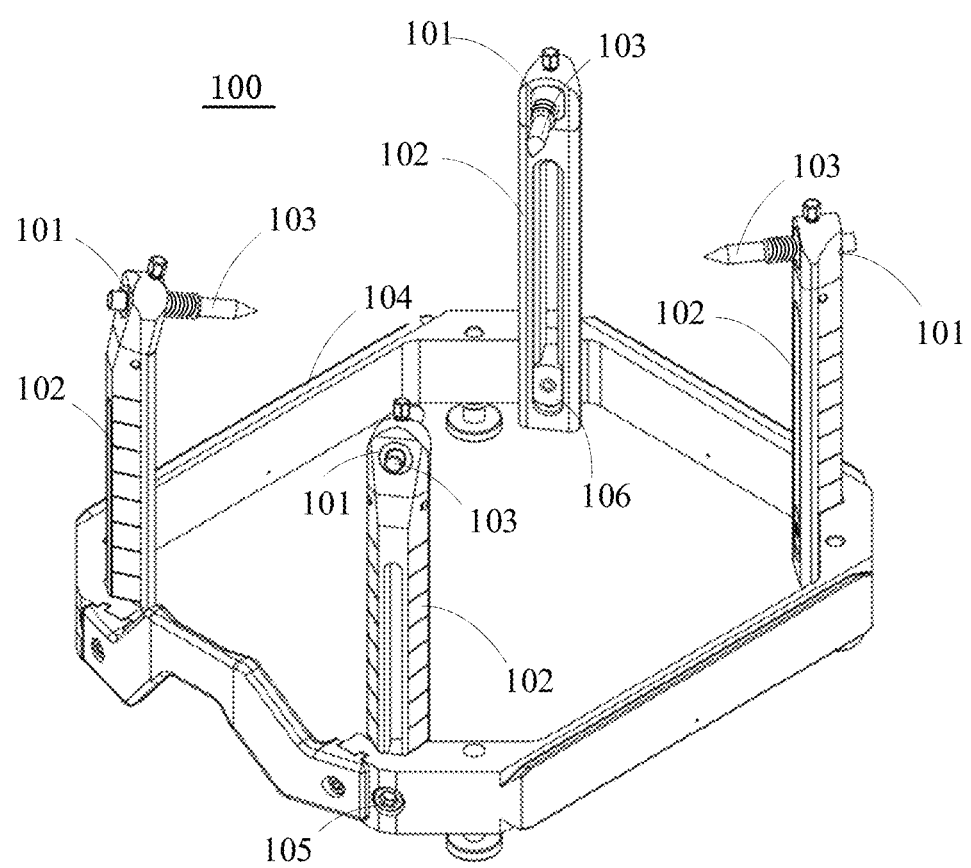
FIG. 10 is a schematic structural diagram of a head positioning frame according to yet still another embodiment of the present disclosure.
Figure 11:
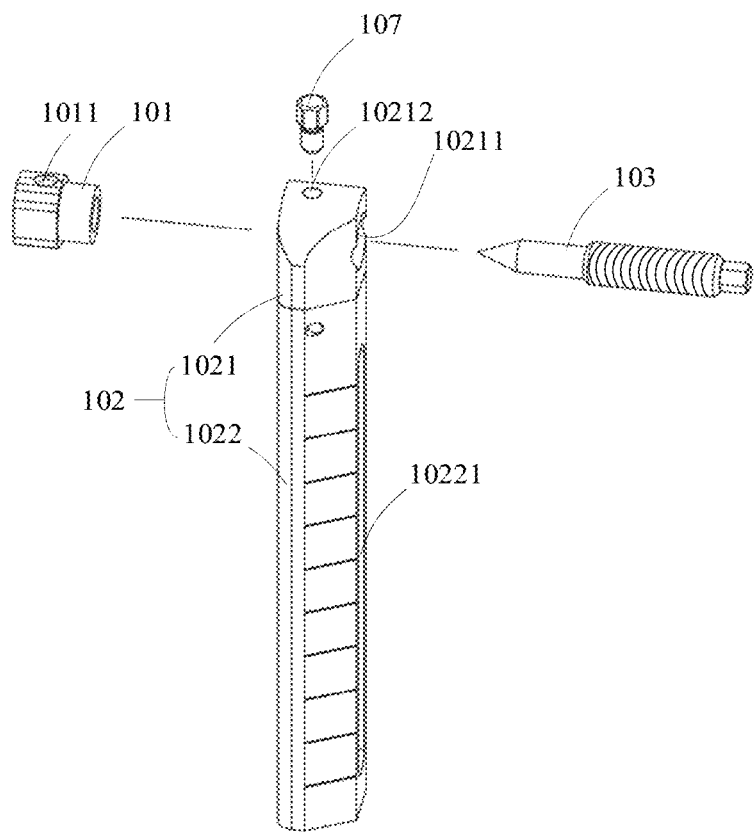
FIG. 11 is an exploded view of a set of sleeve, upright rod, and head nail in a head positioning frame according to yet still another embodiment of the present disclosure.

FIG. 10 is a schematic structural diagram of a head positioning frame according to an embodiment of the present disclosure, and FIG. 11 is an exploded view of a set of sleeve, upright rod, and head nail in a head positioning frame according to an embodiment of the present disclosure.

As shown in FIG. 10 and FIG. 11, the head positioning frame 100 includes multiple sets of sleeve 101, upright rod 102, and head nail 103. For each set of sleeve 101, upright rod 102, and head nail 103, the sleeve 101 is made of the metallic material, the upright rod 102 includes a head nail connecting portion 1021 made of an insulating material, and the head nail 103 is connected to the head nail connecting portion 1021 via the sleeve 101.

In summary, in the head positioning frame according to embodiments of the present disclosure, the head nail may be connected to the head nail connecting portion in the upright rod via a sleeve. The head nail connecting portion is made of an insulating material, and thus has a good insulation, and the sleeve is made of a metallic material, and thus has a good rigidity and is less susceptible to wear. Compared with the related art, the head nail is no longer connected to the upright rod via the insulating sleeve, but to the head nail connecting portion made of the insulating material via the sleeve made of the metallic material. On one hand, the head nail connecting portion is made of the insulating material and has a good insulation, which can effectively avoid the formation of a closed circuit loop formed by the head positioning frame and prevent the burning to the patient. On the other hand, the sleeve is made of the metallic material and has a good rigidity, and is durable and less susceptible to wear even if the sleeve is frequently adjusted, assembled to or disassembled from the head nail, thereby ensuring the fixed connection between the head nail and the upright rod.

It should be noted that the head nail connecting portion 1021 in the aforesaid upright rod 102 may be made of an insulating material, and in this case, other portions of the upright rod 102 may be made of either insulating material or non-insulating material, such as a metallic material with a good rigidity. Of course, it is also possible that some of the other portions are made of the insulating material, and some are made of the non-insulating material, such as a metallic material with a good rigidity.

Optionally, the aforesaid metallic material may be a non-ferromagnetic metallic material. Exemplarily, the non-ferromagnetic metallic material includes one or more of copper, a copper alloy, a titanium alloy, an aluminum alloy, or a magnesium alloy.

Optionally, the aforesaid insulating material may be one or more of ceramic, graphite reinforced fiber plastic, polyetheretherketone (PEEK) plastic, polyformaldehyde (POM) plastic, or polyetherimide (PEI) resin. Of course, the aforesaid insulating material may also be a mixture of the materials listed above and other materials, such as a mixture of ceramic, graphite reinforced fiber plastic, PEEK plastic, POM plastic, or PEI resin with other materials.

It should also be noted that there may be four sets of sleeve 101, upright rod 102, and head nail 103 as shown in FIG. 10, or, of course, there may be two, three, or five sets, etc.

In an embodiment, as shown in FIG. 10, the head positioning frame may further include a base ring 104, and the four upright rods 102 are all connected to the base ring 104.

Optionally, as shown in FIG. 11, the upright rod 102 may further include a base ring connecting portion 1022 connected to the head nail connecting portion 1021, wherein the base ring connecting portion 1022 is further connected to the base ring 104.

The base ring connecting portion 1022 is provided with a waist-shaped hole 10221, which can cooperate with an adjusting bolt 105 and an adjusting block 106 to adjust the height of the upright rod 102. The adjusting bolt 105 connects, after passing through the base ring 104, with the adjusting block 106 within the waist-shaped hole 10221. In the case that it is necessary to adjust the height of the upright rod, by firstly loosening the adjusting bolt, then adjusting the height of the upright rod to a desired height, and finally tightening the adjusting bolt, the complete adjusting process can be performed.

Here, the base ring connecting portion 1022 may be made of a metallic material which has a good rigidity. Compared to the base ring connecting portion 1022 made of an insulating material, the upright rod 102 in its entirety has a better rigidity and can form a more stable connection with the base ring 104.

It should be noted that the upright rod 102 of the head positioning frame is not limited to including two portions, i.e., the head nail connecting portion 1021 and the base ring connecting portion 1022, but may further include other intermediate connecting portions, which are not limited by embodiments of the present disclosure.

Optionally, as shown in FIG. 11, the head nail connecting portion 1021 of the upright rod 102 includes a connecting through hole 10211 into which a sleeve 101 can be fixed. The head nail 103 may be connected to the sleeve 101, such that the head nail is not directly connected to the head nail connecting portion of the upright rod, but connected to the upright rod via the sleeve. In this way, due to the good rigidity of the sleeve made of the metallic material, the sleeve is less susceptible to wear even if being frequently adjusted, assembled to or disassembled from the head nail, thereby ensuring the fixed connection between the head nail and the upright rod.

Figure 12:
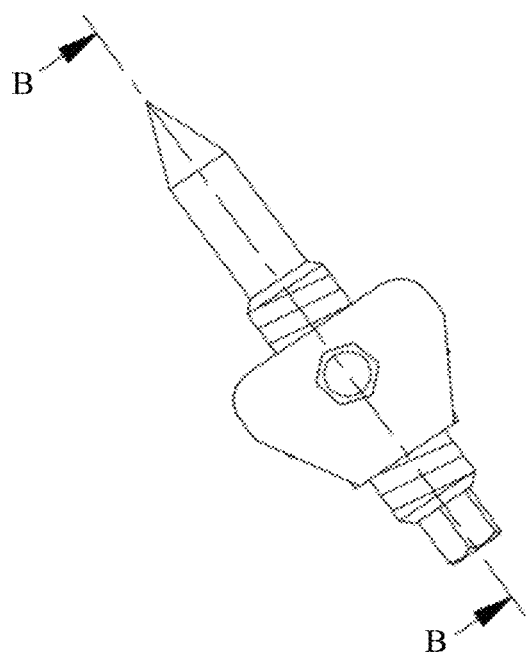
FIG. 12 is a top view of a sleeve, an upright rod, and a head nail in assembled configuration according to yet still another embodiment of the present disclosure.
Figure 13:
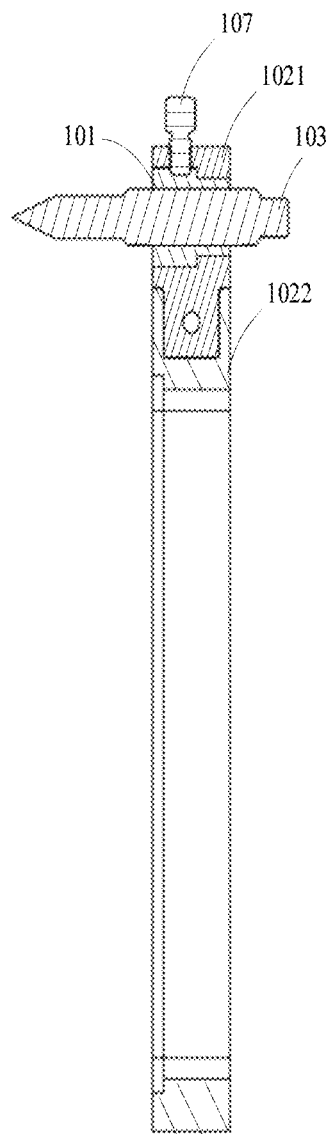
FIG. 13 is a cross-sectional view taken along line B-B of FIG. 3.

For the fixing manner between the sleeve and the connecting through hole, optionally, as shown in FIGS. 11 to 13, the head nail connecting portion 1021 may further include a fastening through hole 10212 which intersects with the connecting through hole 10211. The head positioning frame further includes a fastening pin 107 which passes through the fastening through hole 10212 to abut against the sleeve 101. In this way, the sleeve can be fixedly connected to the connecting through hole, and the sleeve would not be easily moved with the head nail during the adjusting process of the position of the head nail.

Optionally, as shown in FIGS. 11 and 13, the sleeve 101 may include a fastening blind hole 1011, wherein the fastening blind hole 1011 is disposed opposite to the fastening through hole 10212. The fastening pin 107 may pass through the fastening through hole 10212 and then fit into the fastening blind hole 1011. As a result, during the adjusting process of the position of the head nail in the sleeve, the sleeve can be at least blocked from moving, as the position of the head nail being adjusted, in the direction of the center axis of the connecting through hole, because the fastening pin passes through the fastening through hole of the head nail connecting portion and fits into the fastening blind hole in the sleeve.

It should be noted that when the sleeve 101, the upright rod 102, and the head nail 103 are assembled together, the center axis of the connecting through hole 10211 in the head nail connecting portion 1021 of the upright rod 102 is coaxial with the center axis of the sleeve 101 and the center axis of the head nail 103.

To facilitate the coarse or fine adjustment on the position of the head nail, the head nail 103 may be connected to the sleeve 101 via a threaded connection. In other words, a female threaded section is provided in an inner wall of the sleeve 101, a male threaded section is provided on an outer wall of the head nail 103, and the female and male threaded sections engage each other, such that the position of the head nail 103 can be adjusted by rotating the head nail 103 along the thread. During the rotating process of the head nail, as the fastening pin passes through the fastening through hole of the head nail connecting portion and fits into the fastening blind hole in the sleeve, the sleeve can be blocked from rotating, along with the rotation of the head nail, around the center axis of the connecting through hole.

In order to further block the sleeve from rotating, along with the rotation of the head nail, around the center axis of the connecting through hole, an outer contour of at least one cross section of the sleeve 101, along a plane perpendicular to the center axis of the sleeve, may be configured to be non-circular.

Figure 14:
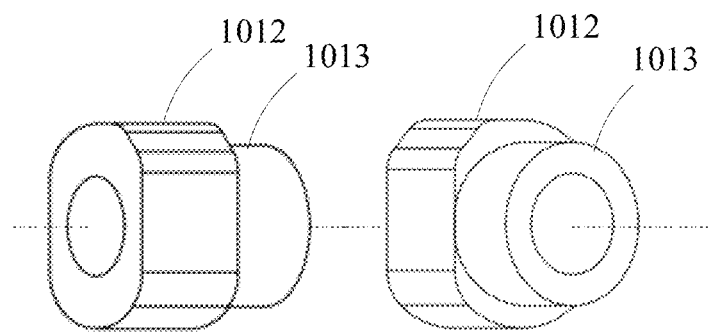
FIG. 14 shows schematic structural diagrams of a sleeve according to yet still another embodiment of the present disclosure viewed from different directions.

Exemplarily, as shown in FIG. 14, the sleeve 101 includes a first sleeve 1012 and a second sleeve 1013, which collectively forms a boss shape with a hollow interior. An end surface of the second sleeve 1013 is smaller than an end surface of the first sleeve 1012, and the hollow interior of the sleeve is configured to accommodate the head nail. The outer contour of the cross section of the first sleeve 1012 along the plane perpendicular to its central axis is waist-shaped, which may prevent the sleeve from rotating, along with the rotation of the head nail, around the center axis of the connecting through hole (or the center axis of the sleeve or the center axis of the hollow interior of the sleeve), and the inner contour is circular for the head nail to pass through. The shape of the outer contour of the cross section of the second sleeve 1013 along the plane perpendicular to the central axis is not limited, and may be circular as shown in FIG. 14 or in other shapes, as long as the inner contour thereof being circular for the head nail to pass through.

Of course, the outer contour of the cross section of the first sleeve 1012 along the plane perpendicular to its central axis may also be in other regular or irregular shapes, such as oval, square, rectangular, pentagonal, hexagonal, isosceles trapezoid, or right-angled trapezoid, etc.

In some other embodiments, the sleeve may also be connected to the connecting through hole by a snap, a clamp or other fixing methods. In a case that a snap connection is adopted, at least one resilient clip may be provided on the sleeve 101, and a slot adapted to the resilient clip is provided in the connecting through hole 10211; and in a case that a clamp connection is adopted, a clamp may be provided in the connecting through hole 10211 for holding the sleeve 101 tightly.

Those skilled in the art may understand that what is listed above is only some, rather than all, of the fixing methods between the sleeve and the connecting through hole. For other fixing methods, the embodiments of the present disclosure will not list them one by one.

Described above are merely illustrative embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A head positioning frame, comprising an upright rod, a base ring, and a head nail, wherein the upright rod is fixedly connected to the base ring, the head nail is fixedly connected to an end of the upright rod, the head nail is further fixedly connected to a head of a patient to be positioned, the upright rod comprises at least two connecting portions, and at least one of the at least two connecting portions is made of an insulating material, such that the upright rod, the base ring, the head nail, and the head of the patient to be positioned are incapable of forming an electrical circuit loop;

wherein one or more other connecting portions of the at least two connecting portions are made of a rigid material;

wherein the at least one of the at least two connecting portions comprises a first connecting portion connected to the head nail and the at least one or more other connecting portions comprises a second connecting portion is connected to the base ring;

wherein the first connecting portion is made of the rigid material, and the second connecting portion is made of the insulating material; or the second connecting portion is made of the rigid material, and the first connecting portion is made of the insulating material; and wherein the head positioning frame further comprises: a fixing bolt, wherein:

the upright rod is provided with a waist-shaped through hole, and the base ring is provided with a seventh through hole; and the fixing bolt is configured to cooperate with the waist-shaped through hole and the seventh through hole, such that the upright rod is fixedly connected to the base ring.

2. The head positioning frame according to claim 1, wherein the rigid material is a titanium alloy.

3. The head positioning frame according to claim 1, wherein a part or all of the base ring is made of a non-magnetic insulating material.

4. The head positioning frame according to claim 1, wherein the first connecting portion and the second connecting portion are respectively provided with a connecting structure to achieve a fixed connection between the first connecting portion and the second connecting portion.

5. The head positioning frame according to claim 4, wherein one of the first connecting portion and the second connecting portion is provided with a first projecting portion, and another one of the first connecting portion and the second connecting portion is provided with a first groove;
wherein the first projecting portion and the first groove forms an interference fit to realize the fixed connection between the first connecting portion and the second connecting portion.

6. The head positioning frame according to claim 4, further comprising: a locking pin, wherein:
one of the first connecting portion and the second connecting portion is provided with a second projecting portion, and another one of the first connecting portion and the second connecting portion is provided with a second groove, the second projecting portion being capable of fitting and being mounted into the second groove;
the second projecting portion is provided with a first through hole having an extending direction perpendicular to a center axis of the upright rod, and a connecting portion in which the second groove is disposed is provided with a second through hole that passes through the second groove and is extending in a direction perpendicular to the center axis of the upright rod; and
the locking pin is configured to fit into the first through hole and the second through hole in a case that the second projecting portion is mounted into the second groove, to realize the fixed connection between the first connecting portion and the second connecting portion.

7. The head positioning frame according to claim 1, wherein the insulating material comprises at least one of: ceramic, or graphite reinforced fiber plastic.

8. The head positioning frame according to claim 1, wherein the insulating material and the rigid material are both non-magnetic materials.

9. A head positioning frame, comprising:
a sleeve, made of a metallic material;
an upright rod, comprising a head nail connecting portion that is made of an insulating material, such that the upright rod, a base ring, a head nail, and a head of a patient to be positioned are incapable of forming an electrical circuit loop;
the head nail, connected to the head nail connecting portion via the sleeve, wherein the head nail is further fixedly connected to the head of the patient to be positioned; and
the base ring, wherein the upright rod further comprises a base ring connecting portion connected to the head nail connecting portion, the base ring connecting portion made of a rigid material and being connected to the base ring, wherein the base ring connecting portion is made of a metallic material;
wherein the head positioning frame further comprises an adjusting bolt and an adjusting block; and
the base ring connecting portion is provided with a waist-shaped hole, and the adjusting bolt connects, after passing through the base ring, with the adjusting block within the waist-shaped hole.

10. The head positioning frame according to claim 9, wherein an outer contour of at least one cross section of the sleeve along a plane perpendicular to a center axis of the sleeve is non-circular.

11. The head positioning frame according to claim 9, wherein the metallic material is a non-ferromagnetic metallic material, and the insulating material comprises at least one of ceramic, graphite reinforced fiber plastic, polyetheretherketone plastic, poly formaldehyde plastic, and polyetherimide resin.

12. The head positioning frame according to claim 11, wherein the non-ferromagnetic metallic material comprises at least one of:
copper, a copper alloy, a titanium alloy, an aluminum alloy, or a magnesium alloy.

13. The head positioning frame according to claim 9, wherein the head nail connecting portion comprises a connecting through hole into which the sleeve is fixed, and the head nail is connected to the sleeve.

14. The head positioning frame according to claim 13, wherein the head nail connecting portion further comprises: a fastening through hole that intersects with the connecting through hole; and the head positioning frame further comprises a fastening pin that passes through the fastening through hole and abuts against the sleeve.

15. The head positioning frame according to claim 14, wherein the sleeve comprises a fastening blind hole, and the fastening pin fits into the fastening blind hole after passing through the fastening through hole.

* * * * *